Dec. 16, 1924.
S. RUBEN
1,519,555
METHOD AND APPARATUS FOR GAS DETERMINATIONS
Filed Feb. 20, 1924
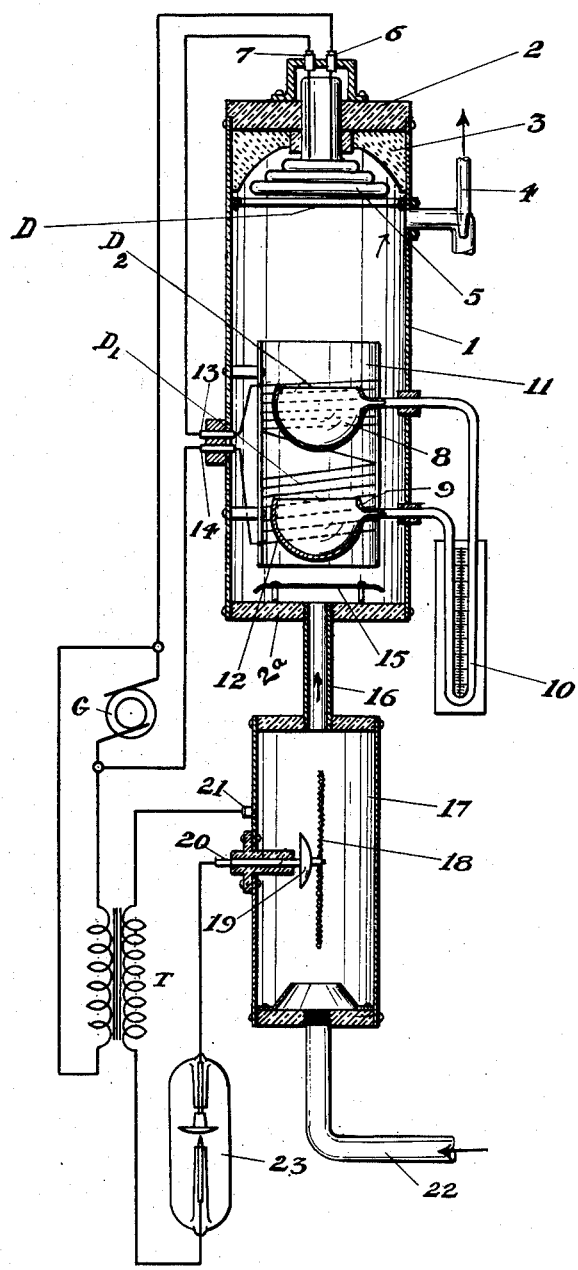
INVENTOR.
Samuel Ruben
BY
M. W. Clephane
ATTORNEY Patented Dec. 16, 1924.

1,519,555

UNITED STATES PATENT OFFICE.

SAMUEL RUBEN, OF NEW YORK, N. Y.

METHOD AND APPARATUS FOR GAS DETERMINATIONS.

Application filed February 20, 1924. Serial No. 694,075.

*To all whom it may concern:*

Be it known that I, SAMUEL RUBEN, a citizen of the United States, and resident of New York, in the county of New York and State of New York, have invented certain new and useful Methods and Apparatus for Gas Determinations, of which the following is a specification.

This invention relates to a method and an apparatus for quantitative determinations of gases and vapors; and more particularly, it relates to a means for employing the radiation absorption characteristics of gases and vapors to quantitatively determine their concentrations.

Its principal object is to provide a means for continuously indicating the composition of binary mixtures of gases and vapors, with great accuracy.

The invention is based upon the known characteristics of different gases and vapors with respect to absorbing radiations of long wave lengths, such, for instance, as those of the infra red series of about 8,000 Au, impressed upon them. For example, infra red radiations, passed through certain gases, such as oxygen or nitrogen, lose little by absorption by the gases; whereas, the absorption constants of other gases for these radiations are of high value. Thus, the absorption constant of the gases named is about 1, while those of carbon dioxide and nitrous oxide are respectively 90 and 335. The quantity of infra red rays transmitted through a gas varies, then, in inverse proportion with the degree of concentration of the radiation absorptive gas in the binary mixture. And the thermal response of a suitable absorptive body varies according to the volume of rays impacting upon it after traversing the gas column; that response may be employed to actuate an indicating means, and, if desired, a recording device.

It is known that infra red rays are emitted from a black body heated to the proper temperature, and that they are absorbed by a non-reflecting surface or black body in their path.

From the following list of infra red absorption constants of gases, it will be noted that absorption is not a function of thermal conductivity: air, 1; oxygen, 1; hydrogen, 1; chlorine, 39; marsh gas, 403; ethylene, 970; ammonia, 1195.

Many of the present day gas determination devices of the thermal type are based upon the thermal conductivities of gases for their operation.

Broadly, the apparatus of my invention consists of an infra red ray generator, a closed gas-containing black body in the path of the rays, means for discharging in their path a gas in a binary mixture, the concentrations of which are to be determined, and connecting gas passages from the vessel, or black body, to a pressure controlled indicating device. Suitable means are provided to compensate for gas and room temperature changes and, if desired, for freeing the entering gases of suspended materials. As changes occur in the composition of the column in the path of the radiations to the absorptive body, the quantity of rays impacting upon that vessel varies and, consequently, its temperature and the temperature and pressure of the gas within it, connecting with the pressure controlled indicating device. The rapidity of response and indication, which latter is a function of the thermal radiation of the gas containing body absorbing the infra red rays, is greatly increased by maintaining that body and its temperature compensating vessel above room temperature.

In order to afford a full understanding of the principles of the invention, one embodiment thereof in a specially desirable practicable form is illustrated in the accompanying drawing, and is hereinafter described in detail for the sake of a concrete illustrative example; but it is to be understood that the invention is not limited to this particular arrangement.

In the drawing referred to, cylindrical chamber 1, closed at its ends by insulating plates 2 and $2_a$, its inner surface being highly reflective, contains infra red radiation generator 5, consisting of a silica-boron glass spiral coil, that part of its surface facing the far end of the chamber 1, being coated with a mixture of graphite and aluminum, this mixture having been found to be permanent and suitable for radiating rays of long wave lengths. Within coil 5, connected by terminals 6 and 7, with alternating current generator G, is a high resistance wire for heating the black surface of coil 5 to radiation temperature. Back of coil 5, is a heat insulator 3.

Within chamber 1 is cylinder 11, in the wall of which is suspended high resistance wire 12, connected in an electrical circuit by terminals 13 and 14, for maintaining air-containing vessels 8 and 9 above room temperature, for their more rapid thermal response. The wall of vessel 8, facing infra red ray generator 5, is a thin silver diaphragm $D_2$, the whole of the outer surface of that vessel being made dull black; temperature compensating vessel 9, having the same volume as vessel 8, has a like diaphragm, $D_1$ but with a reflective surface. The silver diaphragms increase the sensitivity of response of the respective vessels, which connect by air passage with a differential gauge 10, with its pressure controlled liquid column therein.

Adjacent the infra red ray generator 5, is an ebonite diaphragm D to filter out the infra red rays of shorter wave lengths, approaching the visible region of the spectrum. It offers practically free passage to the infra red rays of long wave lengths, but is opaque to those of shorter wave lengths, which are not absorbed by some gases, such, for instance, as carbon dioxide. Its interposition makes for a more sensitive response of the gas-containing vessel 8. Also within chamber 1, is baffle plate 15 to prevent direct impact of the entering gas with vessels 8 and 9.

Connecting by passage 16, with chamber 1, is chamber 17, containing centrally located electrode 18, insulated from the cylinder, and having a static shield 19, and a connecting bar 20. The metal wall of chamber 17 constitutes the other electrode connected by terminal 21 with the supply circuit through transformer T and rectifier 23. At 22 is the gas inlet to electrostatic filter chamber 17. By means of transformer T, and rectifier 23, electrode 18 is continuously maintained at a sufficiently high negative potential to discharge suspended material in the entering gas to wall 17, from which it precipitates to the bottom of the chamber. The filtration element makes the apparatus particularly applicable to flue gas analysis, in which the problem of continuously filtering the gas to remove dust, smoke, etc., has been a serious one. Suction pump 4 serves to draw the gas into and through the apparatus.

When sufficient energy is applied to the coil within the spiral generator 5, infra red radiations are discharged to vessel 8, and, as the gas enters chamber 17, by inlet 22, material suspended therein is extracted and precipitated to the bottom of chamber 17, by the operation of the electrostatic precipitator, the discharge from electrode 18 to electrode 17 carrying that material with it. The filtered gas enters chamber 1, by conduit 16, then, passing between the walls of cylinders 1 and 11, and into the path of the infra red rays discharging from generator 5, to vessel 8, through diaphragm D, the gas passes out of the apparatus by outlet 4, absorbing infra red rays while in their path, according to its degree of concentration in the binary mixture, and excluding from impact with vessel 8 the rays so absorbed and causing a change of its temperature and of the pressure of its contained gas. Assuming air to be normally discharged through the apparatus, when a gas such as carbon dioxide, which has a radiation absorption constant of 90, is admixed therewith in considerable concentration, the volume of infra red rays then reaching diaphragm $D_2$ is much reduced, and the temperature of vessel 8 and the pressure of its gas content will drop accordingly and be reflected in the response or height of the liquid column in indicator 10. If the temperature of the entering mixture is higher than that of vessels 8 and 9, they will become equally heated thereby, and the position of the liquid in the indicator 10, will not be affected.

The apparatus is mounted in such manner as to prevent operation or response of the indicating device by conducted heat.

What I claim is,

1. A method of determining the concentration of a gas in a gaseous mixture by discharging said mixture between an infra red ray generator and a radiation absorptive gas-containing body in the path of said radiations within an enclosed space, said body being connected by suitable means with a pressure controlled indicating device.

2. In a system for indicating the concentration of a gas in a gaseous mixture, in combination, a chamber, and therewithin a source of radiant energy, a gas-filled body absorptive of and sensitively responsive to variations of said energy impressed thereupon, and means for admitting gases within said chamber and means controlled by pressure variations within said body located exteriorly of said chamber for indicating variations in the discharge of said energy upon said body.

3. In a system for indicating the concentration of a gas in a gaseous mixture, in combination, a chamber, and therewithin, a source of radiant energy, a gas filled body absorptive of and sensitively responsive to variations of said energy impressed thereon, and means for admitting gases within said chamber, means for compensating for temperature variations of said gaseous mixture, and means, controlled by pressure variations within said body, located exteriorly of said chamber for indicating variations in the discharge of said energy upon said body.

4. In a system for indicating the concentration of a gas in a gaseous mixture, in combination, a chamber, and therewithin, a source of radiant energy, a gas-filled body, absorptive of and sensitively responsive to variations of said energy impressed thereon, and means for admitting gases within said chamber, and means for electrostatically removing suspended material from said gases, and means controlled by pressure variations within said body for exteriorly indicating variations in the discharge of said energy upon said body.

5. An apparatus for the purpose described comprising a chamber containing a source of infra red radiations, maintained at a radiating temperature, and a thermally responsive body, absorptive of said radiations, connected by air duct with and thermally controlling a pressure indicating means located exteriorly of said chamber.

Signed at New York in the county of New York and State of New York this 13th day of February A. D. 1924.

SAMUEL RUBEN.